United States Patent
Marupaduga et al.

(10) Patent No.: US 10,827,434 B1
(45) Date of Patent: Nov. 3, 2020

(54) CONTROLLING COVERAGE IN A WIRELESS COMMUNICATIONS NETWORK

(71) Applicant: Sprint Communications Company L.P., Overland Park, KS (US)

(72) Inventors: Sreekar Marupaduga, Overland Park, KS (US); Andrew M. Wurtenberger, Olathe, KS (US); Rajveen Narendran, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 19 days.

(21) Appl. No.: 15/654,308

(22) Filed: Jul. 19, 2017

(51) Int. Cl.
- *H04W 52/22* (2009.01)
- *H04W 24/04* (2009.01)
- *H04W 24/08* (2009.01)
- *H04W 52/24* (2009.01)

(52) U.S. Cl.
CPC ......... *H04W 52/228* (2013.01); *H04W 24/04* (2013.01); *H04W 24/08* (2013.01); *H04W 52/242* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 8,400,981 | B1* | 3/2013 | Hobson | ........... | H04W 16/12 370/331 |
| 2003/0162568 | A1* | 8/2003 | Schreiner | ........... | G01S 1/14 455/562.1 |
| 2005/0141545 | A1* | 6/2005 | Fein | ........... | H04B 7/0617 370/445 |
| 2005/0289625 | A1* | 12/2005 | Takagi | ........... | H04N 5/44 725/100 |
| 2008/0233945 | A1* | 9/2008 | Gummadi | ........... | H04W 52/282 455/422.1 |
| 2008/0233958 | A1* | 9/2008 | Robbins | ........... | H04W 36/0094 455/436 |
| 2008/0253308 | A1* | 10/2008 | Ward | ........... | H04W 28/18 370/310 |
| 2009/0270109 | A1* | 10/2009 | Wang Helmersson | ........... | H04W 52/367 455/453 |
| 2010/0220671 | A1* | 9/2010 | Guillouard | ........... | H04B 7/024 370/329 |
| 2010/0284373 | A1* | 11/2010 | Makino | ........... | H04W 36/30 370/332 |
| 2011/0205969 | A1* | 8/2011 | Ahmad | ........... | H04W 16/28 370/328 |
| 2012/0190396 | A1* | 7/2012 | Oyama | ........... | H04W 16/28 455/517 |

(Continued)

*Primary Examiner* — Yuwen Pan
*Assistant Examiner* — Erica L Fleming-Hall

(57) ABSTRACT

Systems and methods for controlling coverage in a wireless communications network after a disruption in a control signal provided to a multi-directional antenna are provided. The system may detect that a disruption has occurred in the control signal, causing the antenna to broadcast in a different mode and leading to a change in the coverage area. The change in the coverage area may cause user devices to experience a drop in coverage or to experience interference from multiple, overlapping coverage areas. In embodiments, the system increases or decreases the power provided to the antenna to control the coverage area and/or limit interference, in order to compensate for the disruption.

17 Claims, 9 Drawing Sheets

(56) References Cited

U.S. PATENT DOCUMENTS

| | | | | |
|---|---|---|---|---|
| 2013/0171946 A1* | 7/2013 | Veihl | .................. | H01Q 21/0006 |
| | | | | 455/73 |
| 2013/0171997 A1* | 7/2013 | Zasowski | ............ | H04W 84/042 |
| | | | | 455/446 |
| 2014/0078922 A1* | 3/2014 | Xing | ...................... | H04J 11/005 |
| | | | | 370/252 |
| 2014/0321314 A1* | 10/2014 | Fodor | .................. | H04W 72/085 |
| | | | | 370/252 |
| 2014/0362750 A1* | 12/2014 | Song | ................ | H04W 36/0072 |
| | | | | 370/311 |
| 2015/0055541 A1* | 2/2015 | Zhang | ................ | H04W 72/005 |
| | | | | 370/312 |
| 2016/0013897 A1* | 1/2016 | Sun | ....................... | H04L 1/0058 |
| | | | | 370/312 |
| 2016/0142124 A1* | 5/2016 | O'Keeffe | ........... | H04B 17/0085 |
| | | | | 455/562.1 |
| 2017/0111218 A1* | 4/2017 | Kasher | ................ | H04B 17/318 |
| 2017/0150302 A1* | 5/2017 | Sorrentino | ............ | H04W 76/14 |
| 2017/0170997 A1* | 6/2017 | Vakilian | ............... | H04B 7/0482 |
| 2017/0303136 A1* | 10/2017 | Park | ...................... | H04W 74/08 |
| 2018/0035393 A1* | 2/2018 | Kazmi | ................ | H04W 52/346 |
| 2018/0198537 A1* | 7/2018 | Rexberg | ............ | H01Q 1/243 |
| 2018/0242160 A1* | 8/2018 | Morita | .................. | H04W 16/08 |

\* cited by examiner

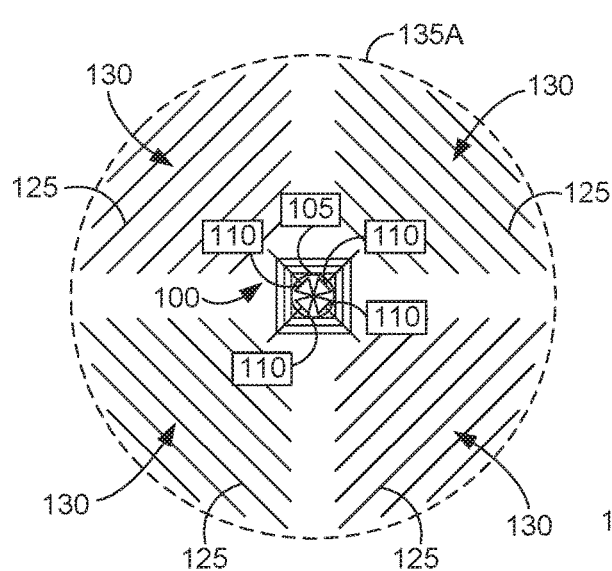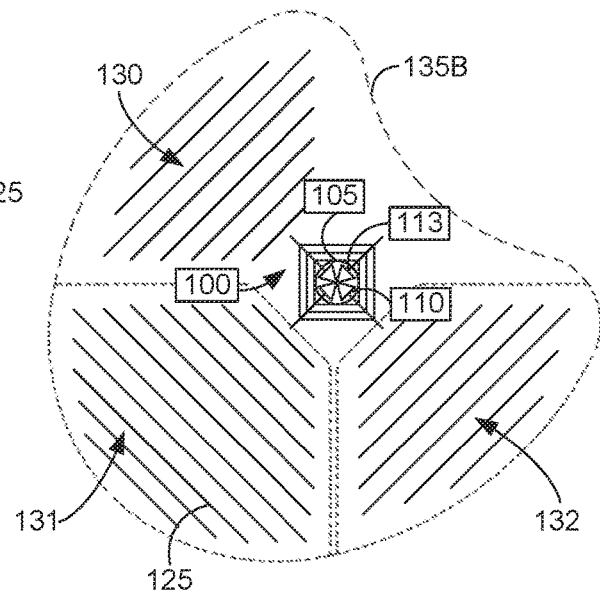
FIG. 3A  FIG. 3B
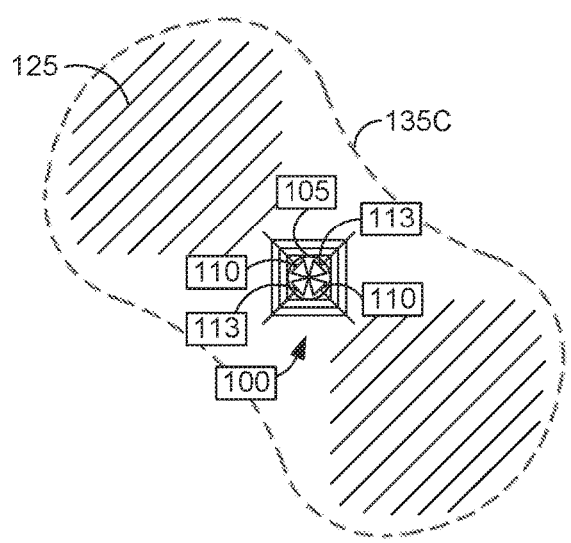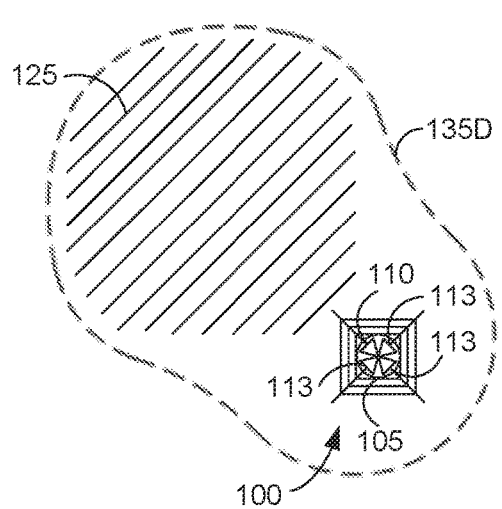
FIG. 3C  FIG. 3D

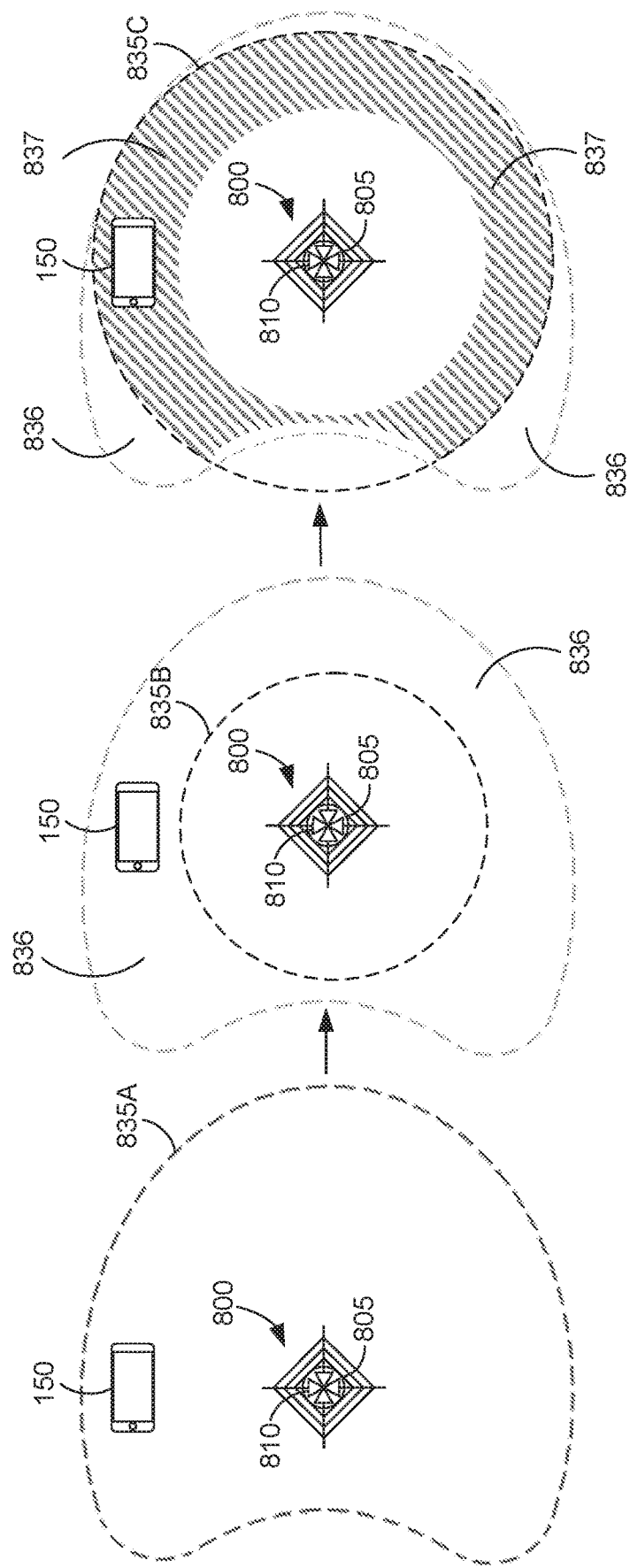

ly, the present disclosure relates to controlling a coverage area provided by an antenna after a disruption that alters the coverage area has occurred.

CONTROLLING COVERAGE IN A WIRELESS COMMUNICATIONS NETWORK

TECHNICAL FIELD

The present disclosure relates to controlling coverage in wireless communications networks. More specifically, the present disclosure relates to controlling a coverage area provided by an antenna after a disruption that alters the coverage area has occurred.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

In brief, this disclosure describes, among other things, systems and methods for controlling coverage in wireless communications networks. Particularly described are systems and methods for controlling network coverage after a disruption has caused a change in a coverage area provided by an antenna system. In some embodiments, a coverage area may be controlled after a disruption by increasing or decreasing power supplied to a multi-directional antenna. The power may be increased or decreased to alter the coverage area to limit interference or recapture coverage area lost due to the disruption.

In one embodiment, a system for controlling coverage in a wireless communications network is provided. The system comprises a base station that has a radio and a multi-directional antenna that is in communication with the radio. The multi-directional antenna has a plurality of signal transmitters, each configured to broadcast a signal over a respective sector of coverage of the multi-directional antenna. The signal broadcast from each of the plurality of signal transmitters is configurable so that the sectors of coverage collectively provide a first coverage footprint. The system also comprises a control server in communication with the multi-directional antenna. The control server may detect a disruption in a control signal communicated to the multi-directional antenna that controls the signals broadcast from the plurality of signal transmitters to form the first coverage footprint, changing the first coverage footprint to a second coverage footprint. The control server also may adjust a power of the multi-directional antenna to modify an area of coverage provided by the multi-directional antenna.

In another embodiment of the present disclosure, a system for controlling coverage in a wireless communications network. The system comprises a first base station that has a first multi-directional antenna and a first radio in communication with the first multi-directional antenna. The first multi-directional antenna comprising a plurality of signal transmitters each configured to broadcast a signal over a respective sector of coverage of the first multi-directional antenna. The system additionally comprises a second base station comprising a second multi-directional antenna and a second radio in communication with the second multi-directional antenna. The second multi-directional antenna comprising a plurality of signal transmitters each configured to broadcast a signal over a respective sector of coverage of the second multi-directional antenna. The system further comprises a control server in communication with the first multi-directional antenna and the second multi-directional antenna. The control server is configured to detect a disruption in a control signal provided to the first multi-directional antenna that alters a first coverage footprint of the first multi-directional antenna such that it overlaps with a second coverage footprint of the second multi-directional antenna. The control server is also configured to adjust a power of at least one of the first and the second multi-directional antennas to reduce the overlap.

In another embodiment, a method for controlling coverage in a wireless communications network is provided. The method comprises detecting, using a control server in communication with a base station comprising a multi-directional antenna and a radio, a disruption in a control signal provided to the multi-directional antenna. The multi-directional antenna has a plurality of signal transmitters configured to broadcast respective signals that collectively form a first coverage footprint of the multi-directional antenna based on the control signal, and the disruption changes the first coverage footprint to a second coverage footprint. The method also provides for adjusting a power of the multi-directional antenna to at least partially recover the first coverage footprint.

The term "antenna" as used in this disclosure may comprise any component used in a wireless communications network that is configured to broadcast and/or receive a wireless communications signal, including one comprising one or more frequency bands.

Additional objects, advantages, and novel features are further described in the detailed description, and in part, will become apparent to those skilled in the art upon examination of this disclosure, or may be learned through practice of the various embodiments of this disclosure.

BRIEF DESCRIPTION OF THE DRAWINGS

The present technology is described in detail below with reference to the attached drawing figures, wherein:

FIGS. 3A-3D show exemplary coverage zones provided by signal transmitters of multi-directional antennas used with different base stations, in accordance with embodiments of the present technology;

FIGS. 8A-8C show a user device relative to exemplary coverage zones of a multi-directional antenna, in accordance with embodiments of the present technology.

DETAILED DESCRIPTION

The subject matter of the present disclosure is described with specificity herein to meet statutory requirements. However, the description is not intended to limit the scope of the technology. Rather, the claimed subject matter may be embodied in other ways, such as to include different steps, combinations of steps, features, or combinations of features, similar to the ones described in this disclosure, and in conjunction with other present or future technologies. Moreover, although the term "step" may be used to identify different elements of methods employed, the term should not be interpreted as implying any particular order among or between various steps unless and except when the order of individual steps is explicitly described and required.

At a high level, embodiments of the present technology relate to systems and methods for controlling a coverage area provided by a multi-directional antenna after a disruption event changes the coverage area. More specifically, the systems and methods provide for a multi-directional antenna having a plurality of signal transmitters that emit sectors of coverage that collectively define a coverage area. If a disruption event occurs that changes the coverage area footprint, power to the signal transmitters may be automatically or manually adjusted to increase or decrease the coverage area, for example, to capture lost coverage area or to decrease interference caused by overlapping coverage. The coverage area may be adjusted temporarily in response to a disruption event so that modifications can be made to restore a desired coverage area.

Figure 1:
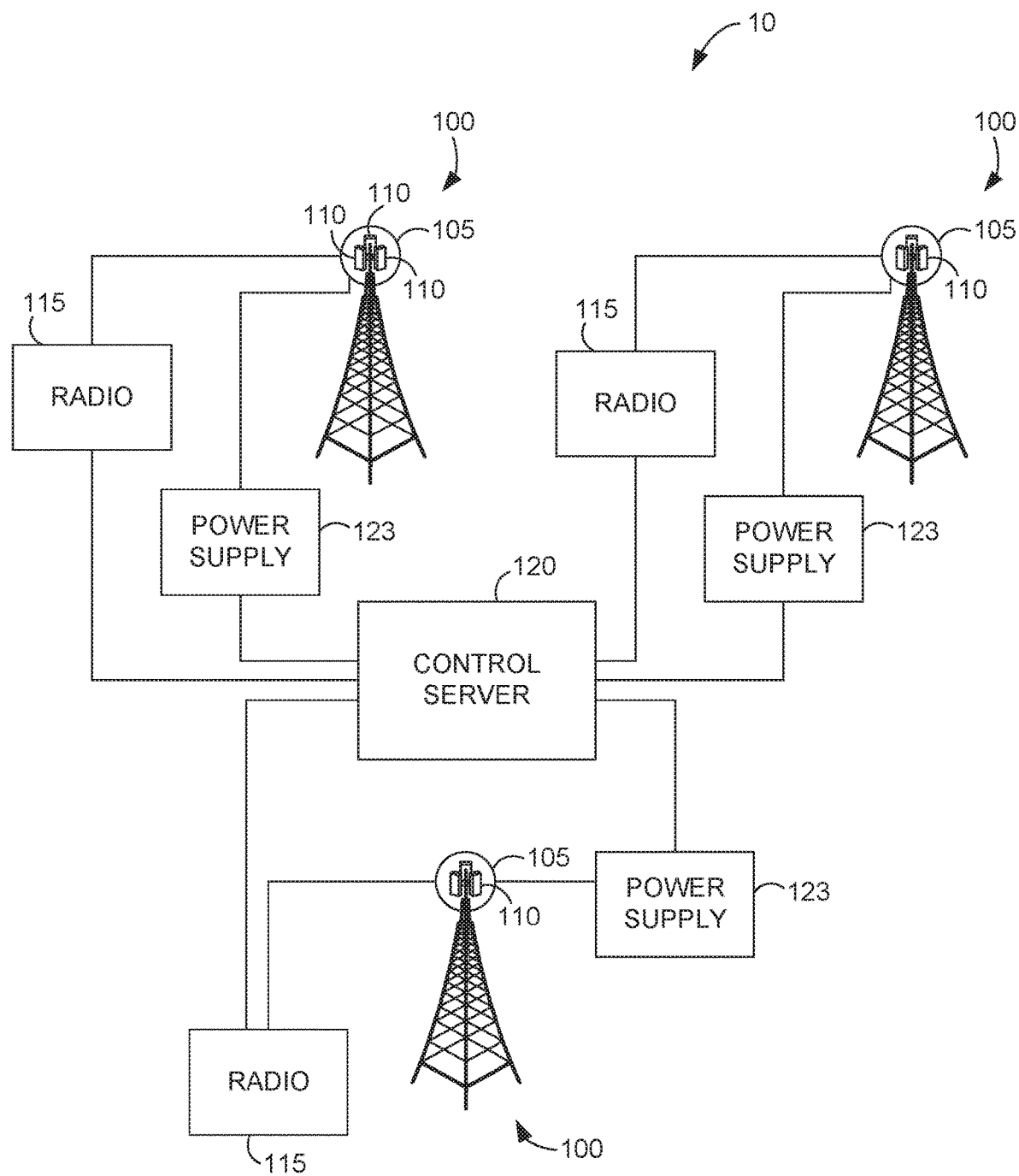
FIG. 1 is an exemplary antenna system for controlling coverage in a wireless communications network, in accordance with an embodiment of the present technology.

Referring now to FIG. 1, an exemplary system 10 for controlling coverage in a wireless communications network is provided, in accordance with an embodiment of the present technology. The system 10 includes a plurality of base stations 100. The base stations 100 each include a multi-directional antenna 105. Each multi-directional antenna 105 includes a plurality of signal transmitters 110. Each multi-directional antenna 105 is in communication with a respective radio 115 and a respective control server 120. Each multi-directional antenna 105 receives power from a respective power supply 123. In some cases, multi-directional antenna 105 and/or signal transmitters 110 may have a minimum and maximum power requirement.

Each multi-directional antenna 105 may be affixed to the base station 100 such that the corresponding plurality of signal transmitters 110 associated with the multi-directional antenna 105 is configurable to transmit a network signal 125 (shown in FIGS. 3A-3D). Turning briefly to FIGS. 3A-3D, the signal transmitters 110 may be configurable to broadcast the network signal 125 over an area of coverage. FIGS. 3A-3D are not intended to limit or describe all of the possibilities of configurable coverage areas, such as 135A-135D. Instead, they are intended to represent exemplary coverage areas 135A-135D that may be provided using the multi-directional antennas 105 and respective plurality of signal transmitters 110 of the same. In FIGS. 3A-3D, the multi-directional antennas 105 each comprise four signal transmitters 110. However, a multi-directional antenna system may comprise any number of signal transmitters. In general, this disclosure references multi-directional antennas 105 as having four signal transmitters 110 that operate independently; however, the present disclosure is applicable to multi-directional antenna systems comprising any number of signal transmitters. In some embodiments, a multi-directional antenna may be a switch-beam antenna.

Continuing with FIGS. 3A-3D, the signal transmitters 110 may be configured to each provide a sector of coverage 130. The sectors of coverage 130 provided by signal transmitters 110 may be defined by the area over which the network signal 125 emitted by a signal transmitter 110 is suitable for network communication. For example, FIG. 3A shows a base station 100 having a multi-directional antenna 105 with four signal transmitters 110. Each signal transmitter 110 in FIG. 3A is active and respectively emitting a network signal 125 over a sector of coverage 130. The sectors of coverage 130 collectively define coverage area 135A.

Additionally, a sector of coverage 130 for each signal transmitter 110 may be individually configurable by controlling the power supplied to the signal transmitter 110. For example, increasing the power to a signal transmitter 110 may increase the area over which the network signal 125 is suitable for network communications. Similarly, decreasing the power supplied to a signal transmitter 110 may decrease the area over which the network signal 125 is suitable for network communication. In some embodiments, an inactive signal transmitter 113 may not emit a network signal at all, thus adding to the configurability of the multi-directional antenna 105. An example of this is illustrated by FIG. 3B, where a first sector of coverage 131 is illustrated as encompassing a larger area than a second sector of coverage 132 (e.g., based on configured power settings). In addition, FIG. 3B depicts an inactive signal transmitter 113. As such, FIG. 3B's coverage area 135B is different than FIG. 3A's coverage area 135A, although both may be configured using the same multi-directional antenna 105. FIG. 3C and FIG. 3D depict other achievable coverage area configurations; namely, 135C and 135D, respectively.

Referring back to FIG. 1, in some embodiments, a radio 115 may be in communication with the multi-directional antennas 105. The radio 115 may function in manners that are generally known in the art. For example, the radios 115 may send a signal, such as the network signal 125 described above, to the respective multi-directional antennas 105 to be emitted by the respective signal transmitters 110. The radio 115 may be located in an area associated with the base station 100, or may be located off-site, at an area away from the base station 100 (i.e., may be local or remotely connected).

The radios 115 and/or the multi-directional antennas 105 may be in communication with a control server 120. In some embodiments, the multi-directional antenna 105 may be communicatively coupled to the control server 120 through the radio 115. Other arrangements are possible, but they are not shown in FIG. 1 for simplicity in describing the present technology. The control server 120 may comprise computer hardware and software. As depicted in FIG. 1, the control server 120 may be in communication with multiple multi-directional antennas 105. However, it is illustrated this way as an example, and in some embodiments, the control server 120 may be in communication with only one multi-directional antenna 105. Like the radio 115, the control server 120 may be at a location associated with the base station 100 and the multi-directional antenna 105. In some embodiments, the control server 120 remotely located. In some embodiments, the control server 120 may be at a location such that it can communicate with more than one multi-directional antenna 105.

The control server 120 may be configured to control the signal emitted from the signal transmitters 110 of the multi-directional antennas 105 by adjusting power from the power supply 123. The control server 120 may be configured to activate and deactivate signal transmitters, such as those illustrated in FIG. 3B as elements 110 and 113, and further described above. As such, the control server 120 may configure and control the coverage area provided by the multi-directional antennas 105. For example, the control server 120 may configure the coverage areas to reflect the exemplary coverage areas 135A-135D in FIGS. 3A-3B.

The control server 120 may also be able to monitor the signals emitted by the signal transmitters 110. For example, if a disruption event occurs and causes a change in the signal transmitted by the signal transmitters 110 (e.g., by changing a configured power of the emitted signal), the control server 120 may detect such an event. Although the control server 120 and the radio 115 may control the signal, disruption events associated with the control server 120, the radio 115, and/or other software or hardware associated with the multi-directional antennas 105 and/or the signal transmitters 110 thereof may cause a change in the signal, thereby changing the coverage area. Upon detecting such an event, the control server 120 may adjust the power provided to the signal transmitters 110 via the power source 123. In some cases, power to multi-directional antenna 105 or signal transmitters 110 may be adjusted to stay within the respective power requirements. Put another way, if the power is increased, it may be increased to a level at or below the maximum power limit, while in some cases, if the power is decreased, it may be decreased to a level at or above a minimum power limit. In this sense, the power may be adjusted to stay within the window of acceptable power minimums and maximums for the respective components or equipment of multi-directional antenna 105 or signal transmitters 110. In some embodiments, the control server 120 may send an alert to a network provider of the disruption event and the automatic actions taken.

As an example, a disruption event to a hardware component at the base station 100 may cause a change of power of a control signal sent to the multi-directional antenna 105. The hardware component may become damaged in a storm; thorough animal activity, such as nesting birds; through deterioration over time; or through any number of other events. In some cases, the disruption event, such as the loss in power, may cause the multi-directional antenna 105 to begin broadcasting in an omnidirectional mode (i.e., with the same emitted signal power in all sectors), instead of its previously configured mode. As such, this change in broadcast mode may subsequently alter the coverage area. For many reasons, this change in coverage area may not be desirable. Some of these reasons are further described below. In response to the disruption event, the control server 120 may automatically or at manual direction adjust the power supply 123 to the multi-directional antenna 105 to at least partially recover or obtain a desired coverage area. For example, the control server 120 may facilitate more power being supplied to the multi-directional antenna 105 to increase the coverage area (e.g., to increase coverage of certain sectors), or it may facilitate less power being supplied to the multi-directional antenna 105 to decrease the coverage area (e.g., to reduce interference from resulting overlapping coverage caused by the disruption event).

In some embodiments, the control server 120 may receive an indication of inter-cell interference. As exemplified in FIG. 4A and FIG. 5B, zones of interference 140 may occur when coverage areas overlap, such as 135 and 235A in FIG. 4A, and 135 and 235D in FIG. 5B. When user devices, such as mobile phones, tablets, mobile computers, or any other device that may communicate via the network, are in the interference zones 140, inter-cell interference may be detected. The control server 120, receiving an indication of the inter-cell interference, may adjust the coverage area of one or more multi-directional antennas of interfering base stations to reduce or eliminate the inter-cell interference. In some embodiments, the control server 120 may do this automatically in response to receiving an indication of the inter-cell interference. It may also adjust coverage areas after inter-cell interference has reached a threshold amount (e.g., a predetermined number of interfering mobile devices). It may also adjust coverage areas to reduce or minimize inter-cell interference, or reduce inter-cell interference below a threshold amount.

Figure 2:
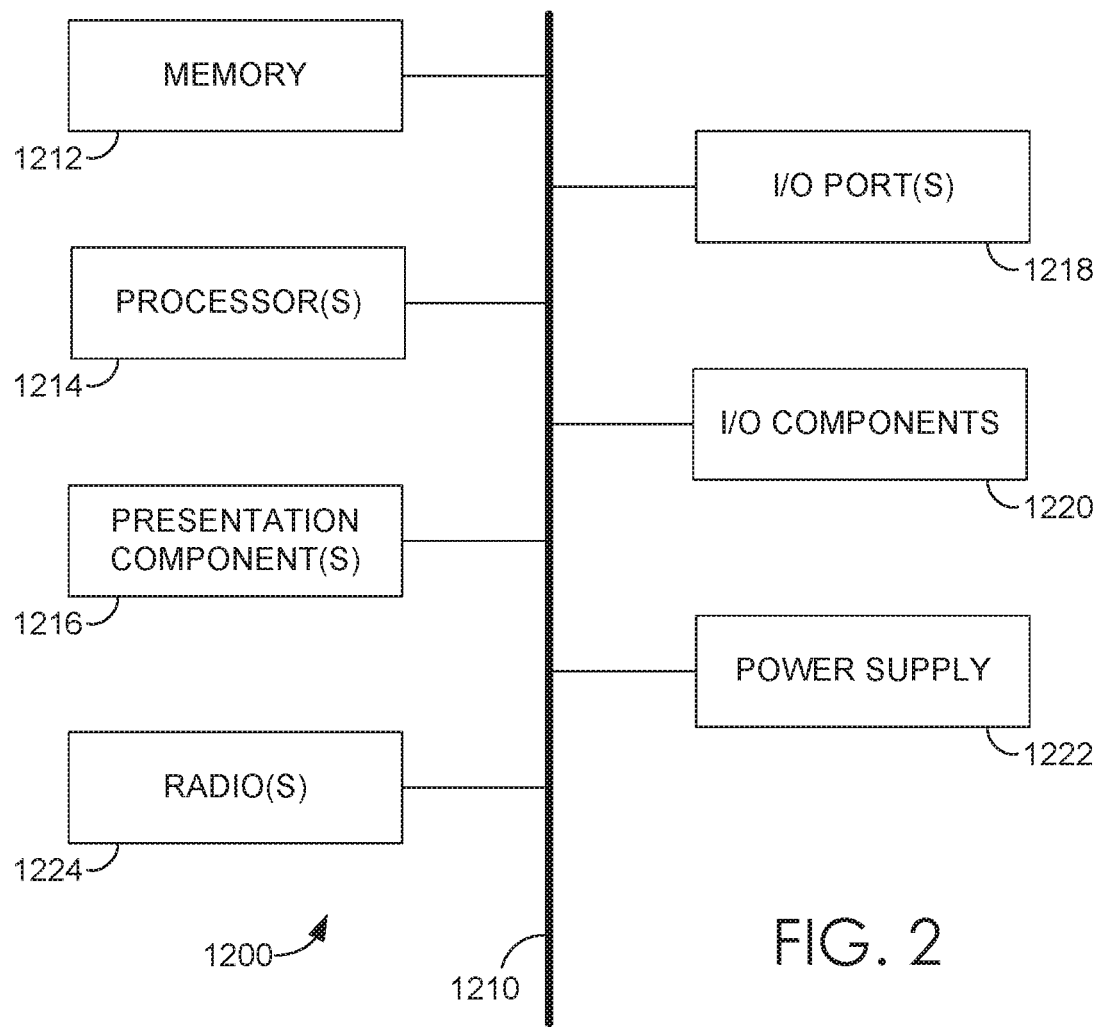
FIG. 2 is a block diagram of an exemplary computing environment that can be used with embodiments of the present disclosure.

Turning now to FIG. 2, an exemplary operating environment that may be used to implement the embodiments described by the present disclosure is provided. Exemplary computing device 1200 provides one suitable embodiment. For example, in some embodiments, the control server 120 (FIG. 1) may utilize or comprise computing device 1200. Computing device 1200 is but one example of a suitable computing environment and is not intended to suggest any limitation as to the scope of use or functionality of the embodiments described in the present disclosure. Additionally, computing device 1200 should not be interpreted as having any dependency or requirement relating to any one or a combination of components illustrated.

Some embodiments of computing device 1200 may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular data types. A variety of system configurations, including hand-held devices, consumer electronics, general-purpose computers, and more specialty computing devices, among others may be practiced. Further, some embodiments may be practiced in distributed computing environments where tasks are performed by remote-processing devices that are linked through a communications network.

With reference to FIG. 2, computing device 1200 includes a bus 1210 that directly or indirectly couples the following devices: memory 1212, one or more processors 1214, one or more presentation components 1216, input/output (I/O) ports 1218, I/O components 1220, an illustrative power supply 1222, and one or more radios 1224 (such as radio 115 of FIG. 1). Bus 1210 represents what may be one or more busses (such as an address bus, data bus, or a combination thereof). Although the various blocks of FIG. 2 are shown with lines for the sake of clarity, in reality, delineating various components is not as clear, and metaphorically, the lines may be blurred. For example, one may consider a presentation component 1216, such as a display device, to be an I/O component 1220. Also, processors 1214 may themselves have memory 1212.

Additionally, computing device 1200 may include a variety of computer-readable media and/or computer storage media. Computer-readable media may be any available media that can be accessed by computing device 1200 and includes both volatile and nonvolatile media, removable and non-removable media. By way of example and not limitation, computer-readable media may comprise computer storage media and communication media and/or devices. Computer storage media may include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. These memory components can store data momentarily, temporarily, or permanently. Computer storage media does not include signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Communications media does not include signals per se.

With reference to FIG. 2, memory 1212 includes computer storage media in the form of volatile and/or non-volatile memory. The memory may be removable, non-removable, or a combination thereof. Exemplary hardware devices include solid-state memory, hard drives, optical-disc drives, etc. Computing device 1200 includes one or more processors 1214 that read data from various entities such as memory 1212 or I/O components 1220. Presentation component(s) 1216 present data indications to a user or other device. Exemplary presentation components include a display device, speaker, printing component, vibrating component, etc. I/O ports 1218 allow computing device 1200 to be logically coupled to other devices including I/O components 1220, some of which may be built-in. Illustrative components include a microphone, joystick, game pad, satellite dish, scanner, printer, wireless device, and the like.

Figure 4A:
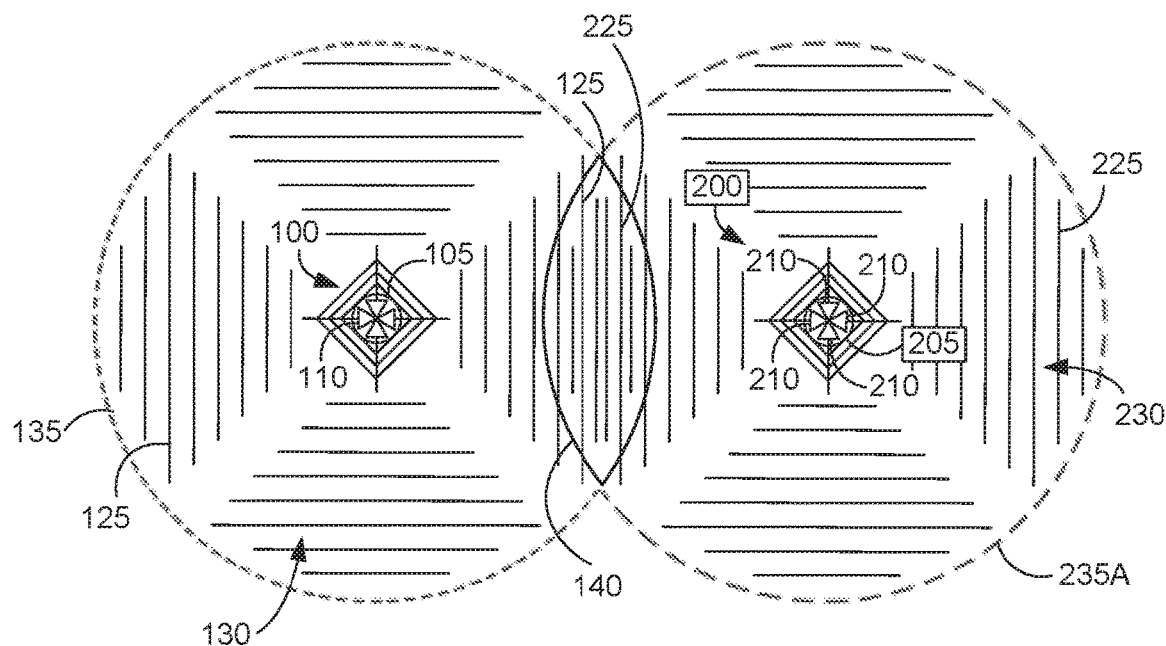
FIGS. 4A-4B show exemplary coverage zones and interference zones from two multi-directional antennas used in adjacent base stations, in accordance with embodiments of the present technology.
Figure 4B:
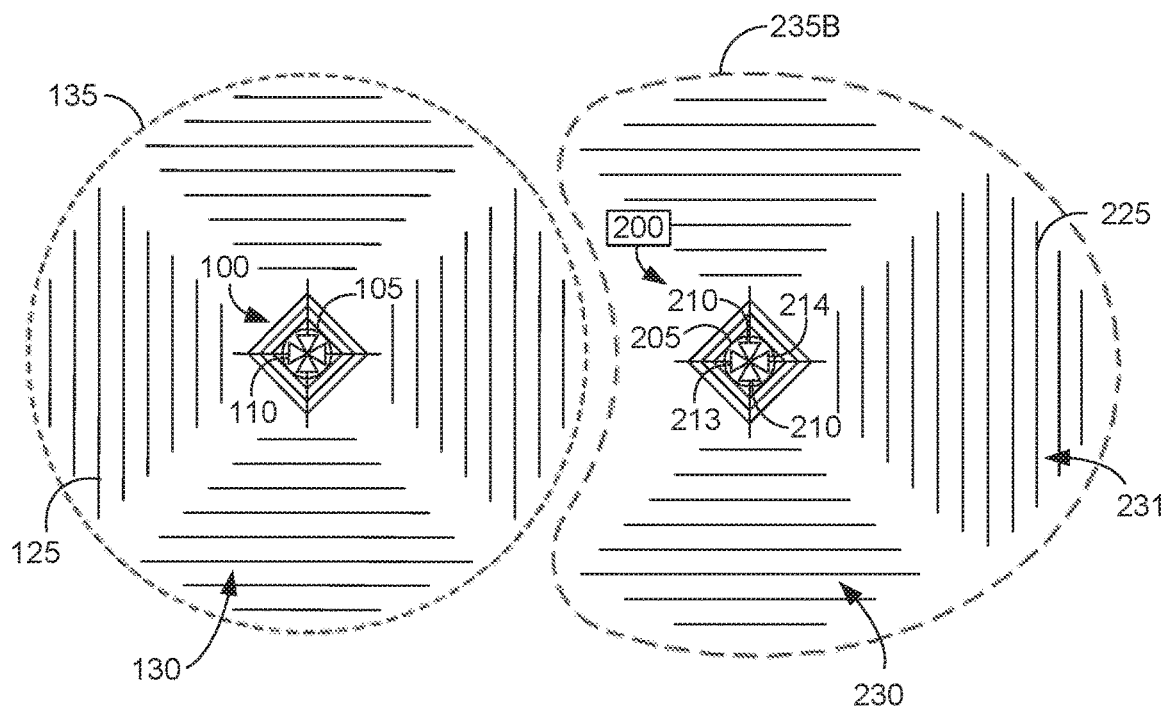

With reference now to FIGS. 4A-4B, an exemplary interaction between two multi-directional antennas and coverage areas is provided, in accordance with an embodiment of the present technology. FIG. 4A illustrates a base station 100 having a multi-directional antenna 105 with signal transmitters 110. In this embodiment, each of the signal transmitters 110 is emitting a network signal 125 that respectively defines a sector of coverage 130, where the sectors of coverage 130 collectively define a coverage area 135. Also provided in FIG. 4A is a second base station 200 geographically separated from base station 100. The second base station 200 comprises a second multi-directional antenna 205 having signal transmitters 210. Similarly, the signal transmitters 210 are emitting a network signal 125 that respectively defines a sector of coverage 230, where the sectors of coverage 230 collectively define coverage area 235A. In some embodiments, the network signal 125 broadcasted by multi-directional antennas 105 and 205 may be the same, and in other embodiments, they may be different. In some cases, coverage area 135 and/or coverage area 235A may be set to minimize inter-cell interference. Put another way, coverage areas 135 and/or 235A may be defined to reduce cellular interference below a predefined threshold level. Both base stations 100 and 200 are illustrated as having their respective multi-directional antenna 105 and 205 transmitting equal signal strengths through the signal transmitters 110 and 210 (e.g., each broadcasting in an omnidirectional mode).

Figure 6A:
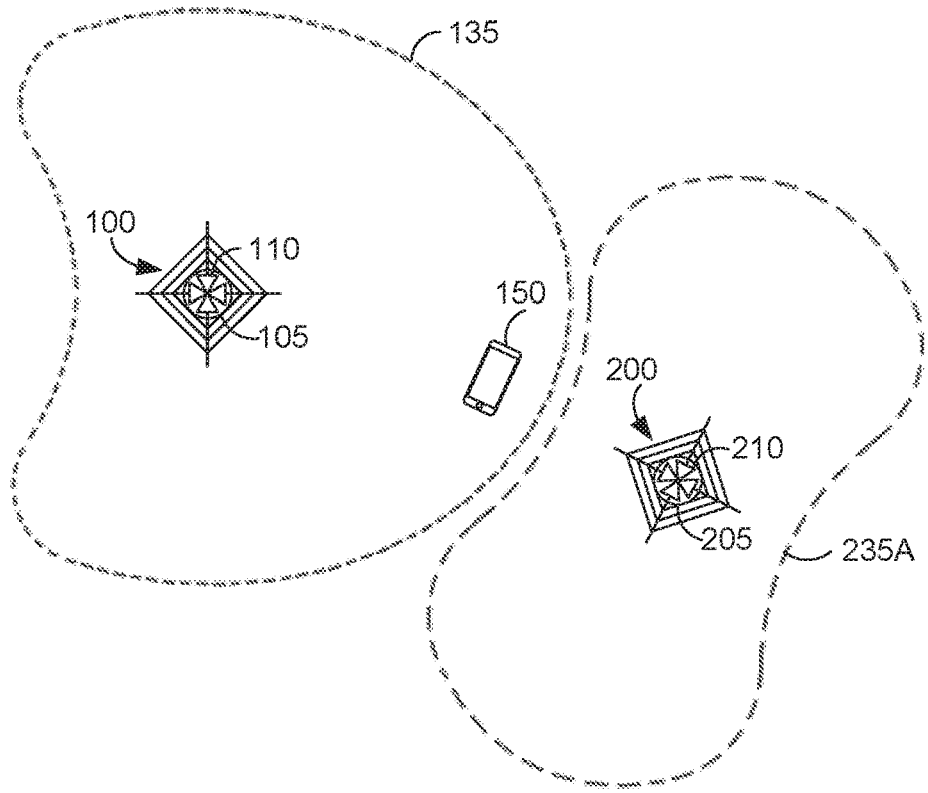
FIGS. 6A-6B show a user device relative to exemplary coverage zones and interference zones of two multi-directional antennas used in adjacent base stations, in accordance with embodiments of the present technology.
Figure 6B:
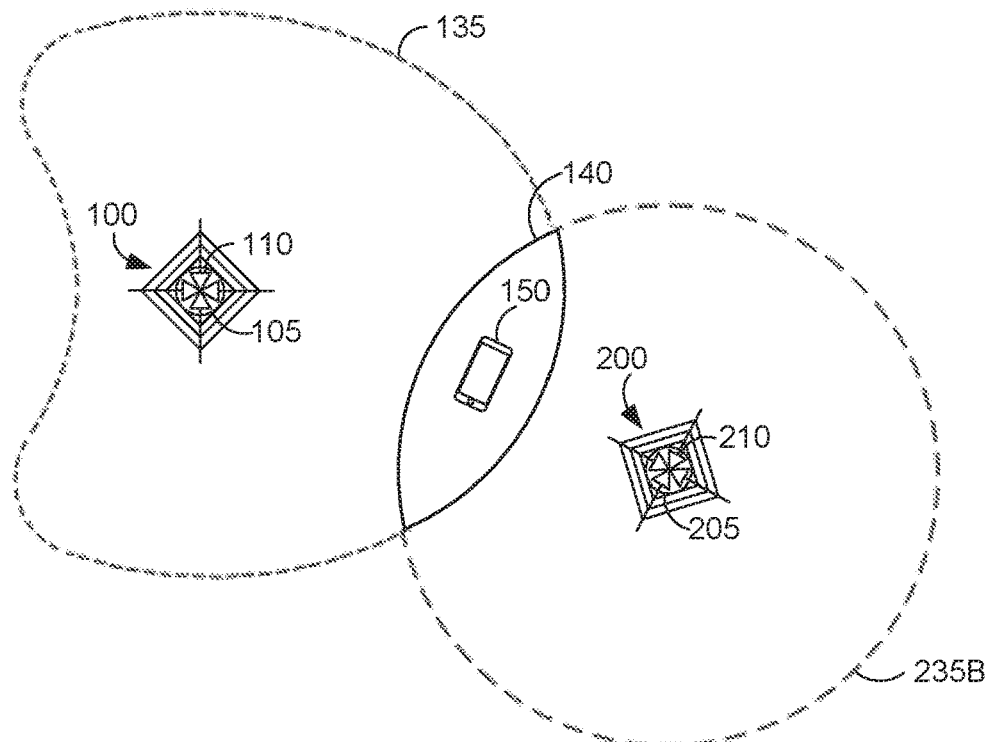

In FIG. 4A, the coverage areas 135 and 235A overlap. This overlap may cause an interference zone 140. The interference zone 140 may be associated with poor connection for user devices that are within the interference zone 140. An exemplary illustration of a user device 150 within the interference zone 140 is depicted in FIG. 6B. The interference zone 140 may not be desired because user devices 150 in the interference zone 140 may experience dropped calls, poor connectivity, lower battery life, poor sound quality, and a number of other negative network-related user experiences.

To alleviate some of these problems, the coverage area 235A may be configured in a manner to reduce, limit, and/or eliminate interference zone 140. As an example, coverage area 235A may be configured to coverage area 235B in FIG. 4B. FIG. 4B is provided to exemplify how the multi-directional antenna 205 and its signal transmitters 210 may be configured to reduce or eliminate the interference zone 140. As depicted, one of the signal transmitters 213 has been rendered inactive, while signal transmitter 214 has been configured to emit the network signal 225 over a larger zone of coverage 231. For example, signal transmitter 214 may be receiving more power than signal transmitters 210. In some embodiments, the control server 120 (discussed with respect to FIG. 1) facilitates and controls this change in configuration. This may be done automatically, or it may be done as a result of command prompts from, for instance, a technician manually setting the configuration. In some embodiments, the control server 120 may adjust coverage area 235B in a manner that maximizes the area covered while minimizing interference zones, such as interference zone 140. In some embodiments, it may do this automatically by detecting inter-cell interference and adjusting the coverage zones to reduce or eliminate the interference.

Figure 5A:
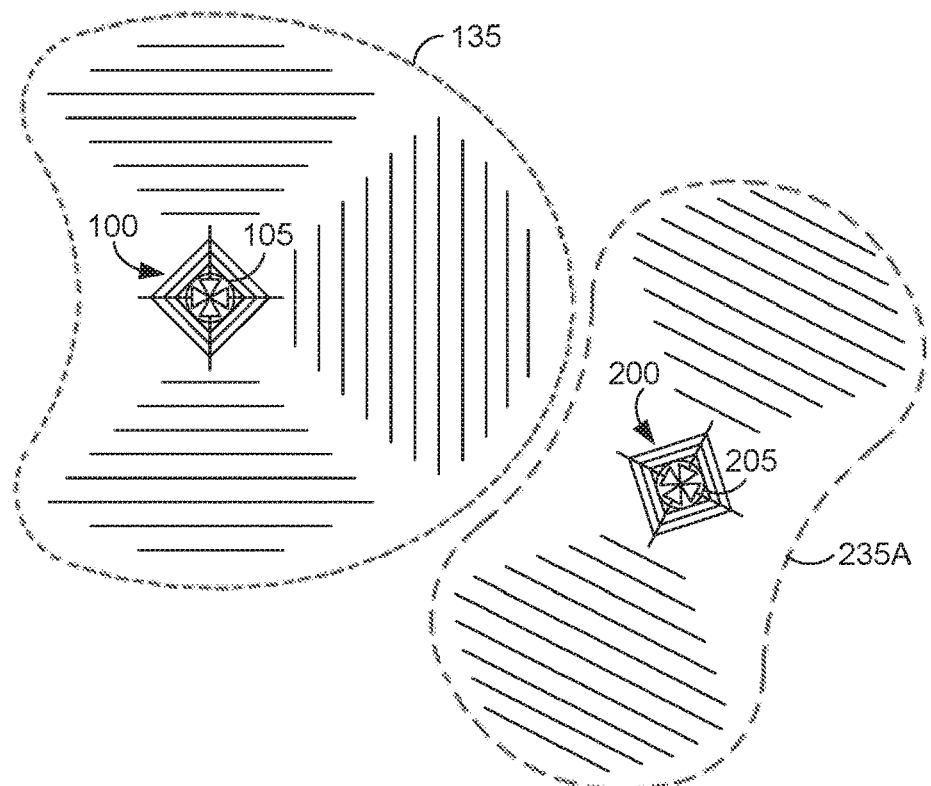
FIGS. 5A-5B show exemplary coverage zones and interference zones from two multi-directional antennas used in adjacent base stations, in accordance with embodiments of the present technology.
Figure 5B:
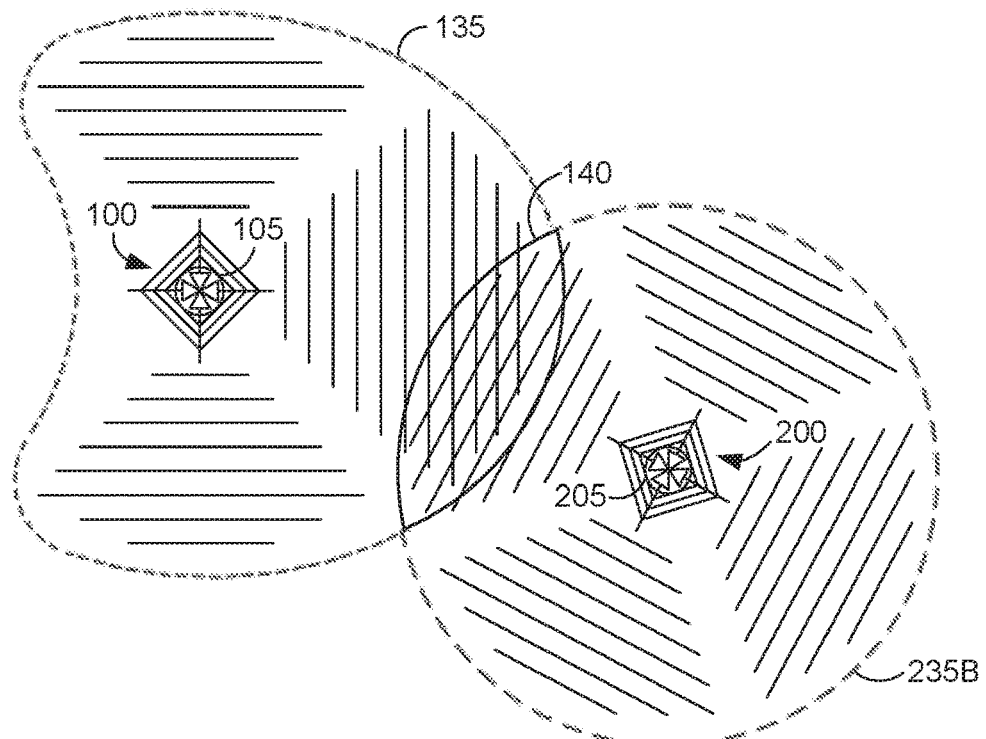

FIGS. 5A-5B depict the exemplary base stations 100 and 200 of FIGS. 4A-4B with coverage areas 135 and 135A that have been configured in a different manner. In the exemplary embodiment represented by FIG. 5A, coverage areas 135 and 235A have been configured to minimize interference, i.e., coverage area 135 does not overlap with coverage area 235A. However, FIG. 5B represents the same exemplary embodiment after a disruption event associated with base station 200. In FIG. 5B, coverage zone 235B results from the disruption event, as the multi-directional antenna 205 now broadcasts in an omnidirectional mode. As a result, coverage area 135 overlaps with coverage area 235B, causing a zone of interference 140. FIGS. 6A-6B illustrate the same scenario with respect to user device 150.

Figure 7C:
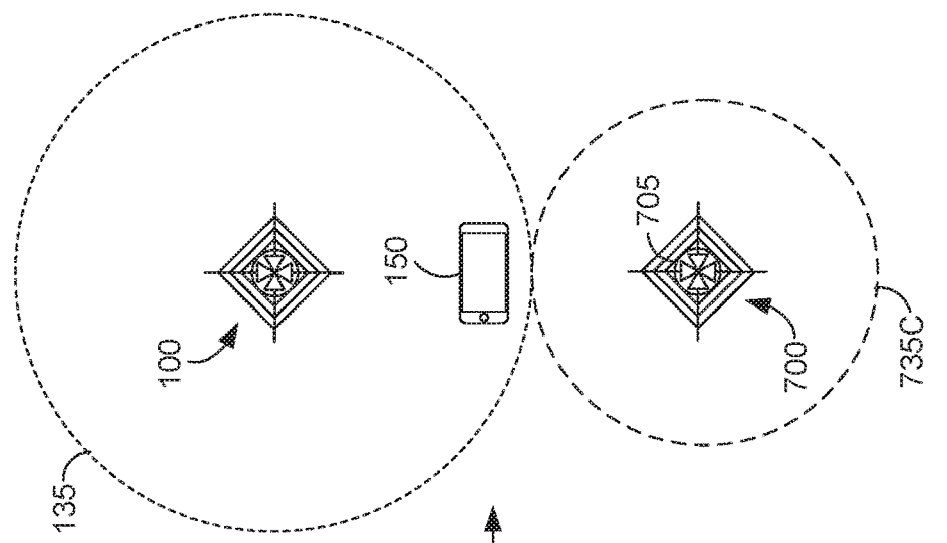
FIGS. 7A-7C show a user device relative to exemplary coverage zones and interference zones of two multi-directional antennas used in adjacent base stations, in accordance with embodiments of the present technology.
Figure 7B:
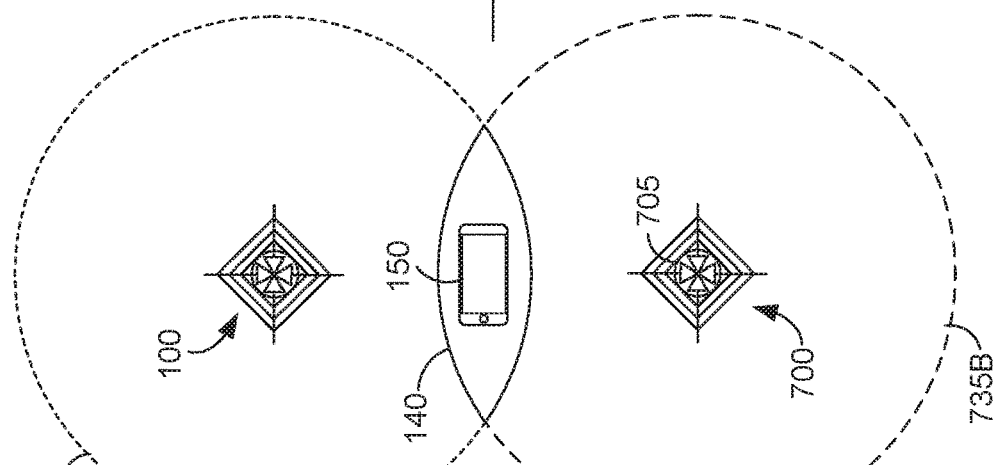
Figure 7A:
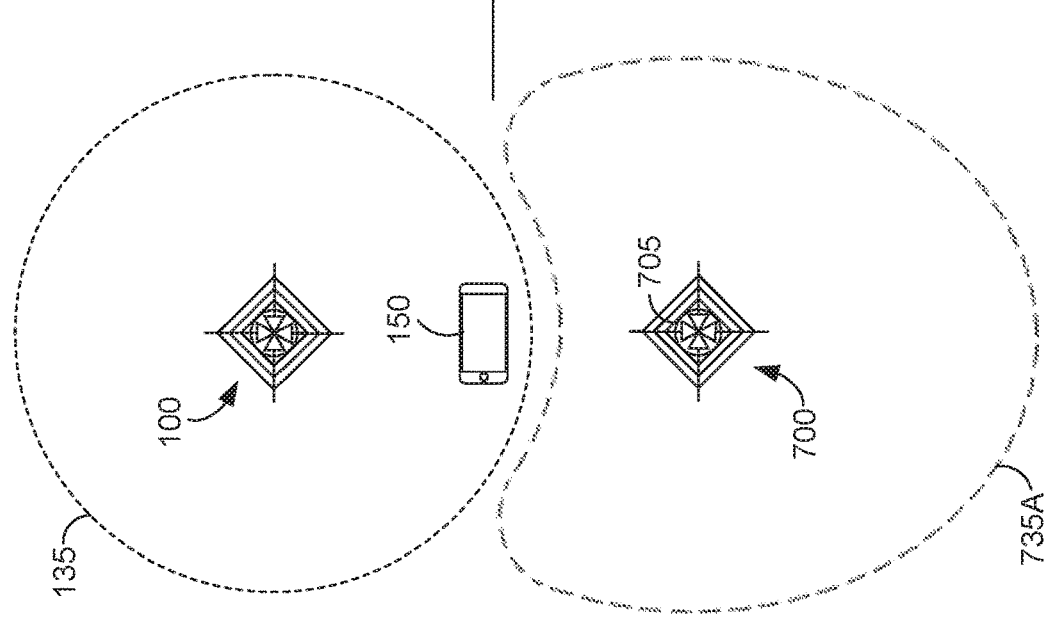

Turning now to FIGS. 7A-7C, an exemplary method performed by an embodiment of the present technology is illustrated. FIGS. 7A-7C depict two base stations 100 and 700 separated by a geographical distance. In FIG. 7A, the multi-directional antenna 705 has been configured to broadcast over coverage area 735A, such that coverage area 735A does not overlap with coverage area 135 in order to limit interference. User device 150 is shown within coverage area 135. FIG. 7B depicts base station 700 after a disruption event has caused the multi-directional antenna 705 to broadcast in an omnidirectional mode, changing coverage area 735A (FIG. 7A) to coverage area 735B (FIG. 7B). As a result, coverage area 735B overlaps with coverage area 135 creating an interference zone 140. User device 150 is within the interference zone 140. As described above, in some embodiments, inter-cell interference may be detected because user device 150 is within interference zone 140. FIG. 7C depicts coverage zone 735C, which results from the adjustment of power supplied to the multi-directional antenna 705, for instance, in manners described above. Due to the reduced power supplied to the multi-directional antenna 705, FIG. 7C shows user device 150 within coverage zone 135, but no longer in the interference zone 140 shown in FIG. 7B. The transition of coverage area 735B to 735C may be one exemplary method of maximizing coverage area of the omnidirectional mode, while reducing interference with other coverage areas, such as coverage area 135. In some instances, this coverage area may be temporary until the multi-directional antenna 705 can be reconfigured to broadcast over a more desirable coverage area. For example, the multi-directional antenna 705 may continue to broadcast signal over coverage area 735C until it can be determined what caused the disruption event and appropriate corrective action can be taken.

FIGS. 8A-8C illustrate another exemplary method performed by an embodiment of the present technology. FIGS. 8A-8C depict base station 800 having a multi-directional antenna 805 with signal transmitters 810. FIG. 8A shows preconfigured coverage area 835A and user device 150 within the coverage area 835A. FIG. 8B illustrates coverage area 835B, which may have resulted from a disruption event that caused the multi-directional antenna 805 to broadcast in an omnidirectional mode. As a result, user device 150 is outside of coverage area 835B, and consequently, may be receiving a weak network signal or no network signal at all. FIG. 8C illustrates one coverage area 835C that may result from an increase in power supplied to the multi-directional antenna 805. In this example, the multi-directional antenna 805 is still broadcasting in an omnidirectional mode; however, the increase in power has increased the coverage area of 835B (FIG. 8B) to coverage area 835C (FIG. 8C). Accordingly, user device 150 is within coverage area 835C. The increase in power may be provided to recapture at least a portion of the lost coverage area 836 due to the disruption event (e.g., the loss or change of signal that controls the configured or uneven power distribution between the signal transmitters that provides the desired coverage footprint). FIG. 8C illustrates the recaptured coverage area 837 after the increase in power.

Figure 9:
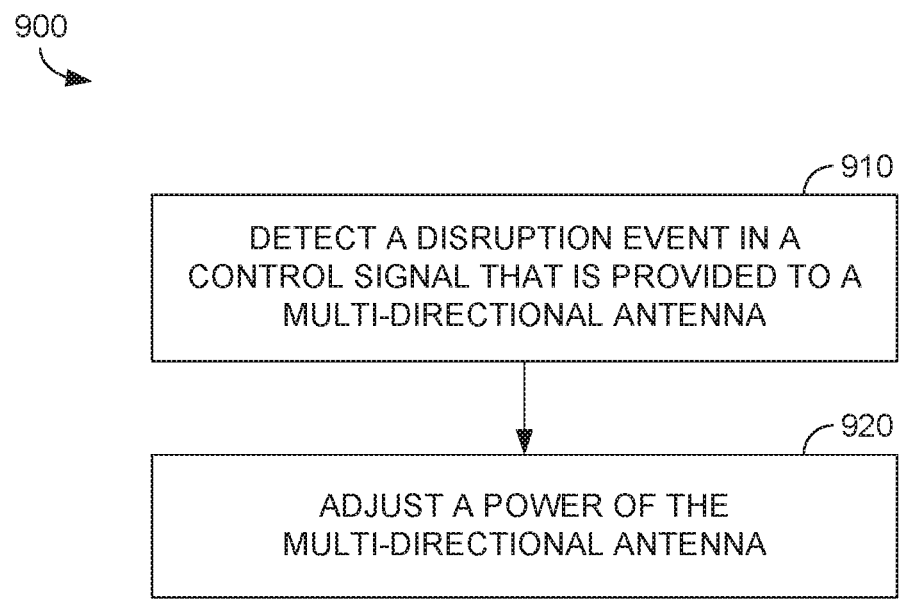
FIG. 9 is a block diagram of an exemplary method of controlling a coverage area after a disruption, in accordance with an embodiment of the present technology.

FIG. 9 is a block diagram of one exemplary method 900 of controlling coverage in a wireless communications network, in accordance with an embodiment of the present technology. At block 910, a control server in communication with a base station detects a disruption in a control signal that is provided to a multi-directional antenna at the base station. In some cases, the base station may also have a radio associated with it. Additionally, the multi-directional antenna may comprise a plurality of signal transmitters that are configured to broadcast respective signals that collectively form a first coverage footprint of the multi-directional antenna based on the control signal. The occurrence of the disruption may change the first coverage footprint to a second coverage footprint (e.g., omni-directional). At block 920, a power of the multi-directional antenna is adjusted to at least partially recover the first coverage footprint.

In another exemplary method for controlling coverage in a wireless network, a base station is provided that includes a multi-directional antenna. The multi-directional antenna may be in communication with a radio. The multi-directional antenna may comprise a plurality of signal transmitters that broadcast a network signal. The broadcasted network signal from the plurality of signal transmitters may collectively provide a coverage area having a first coverage footprint. The method may include providing a control server that is in communication with the multi-directional antenna and/or the radio. The control server may further be in communication with a power source that supplies power to the multi-directional antenna and/or the plurality of signal transmitters. The control server may receive an indication of a disruption associated with the multi-directional antenna. In some cases, the disruption may be to the control signal. The disruption may change the first coverage footprint to a second coverage footprint. Subsequent to the change in coverage area footprint, the control server may adjust power supplied to the multi-directional antenna to change the coverage footprint to reduce interference and/or recapture lost coverage area occurring as a result of the disruption. In some cases, the second coverage footprint may be a reduction in the coverage area, for instance, if the power was reduced, or the second coverage footprint may be a larger coverage area, for instance, if the power was increased.

From the foregoing, it will be seen that this disclosure is one well adapted to attain all the ends and objects described and with other advantages that are obvious and/or are inherent to the structure.

It will be understood that certain features and subcombinations are of utility and may be employed without reference to other features and subcombinations. This is contemplated by and is within the scope of the claims.

Since many possible embodiments may be made of the disclosure without departing from the scope, it is to be understood that all matter described or shown in the accompanying drawings is to be interpreted as illustrative and not in a limiting sense.

What is claimed is:

1. A system for controlling coverage in a wireless communications network, the system comprising:
 a base station, comprising:
 a radio, and
 a multi-directional antenna in communication with the radio, the multi-directional antenna comprising a plurality of signal transmitters each configured to broadcast a signal over a respective sector of coverage of a first coverage footprint; and
 a control server in communication with the multi-directional antenna and configured to:
 detect a disruption event in a control signal communicated to the multi-directional antenna from the base station, wherein the control signal controls the signals broadcast from the plurality of signal transmitters to form the first coverage footprint having a first coverage area, the disruption changing the first coverage footprint to a second coverage footprint having a second coverage area;
 and
 adjust a power supply to the multi-directional antenna to modify the second coverage footprint to a third coverage footprint having a third coverage area, wherein the third coverage area is more desirable than the second coverage area, wherein the power supply is increased to increase a coverage area and wherein the power supply is decreased to decrease the coverage area.

2. The system of claim 1, wherein the control server is further configured to determine if the disruption event resulted in a loss of coverage to at least a portion of the first coverage area provided by the first coverage footprint, and wherein upon a determination that the disruption event resulted in the loss of coverage, increase the power supply to the multi-directional antenna to at least partially recover the portion of the first coverage area of the first coverage.

3. The system of claim 1, wherein the plurality of signal transmitters are individually configurable with individual power levels.

4. The system of claim 1, wherein the plurality of signal transmitters comprises four signal transmitters, and wherein each of the four signal transmitters has an independently configurable power level.

5. The system of claim 1, wherein the disruption event is a loss of power to at least one signal transmitter of the plurality of signal transmitters.

6. The system of claim 1, wherein the multi-directional antenna is a switch-beam antenna.

7. The system of claim 1, wherein the disruption causes the multi-directional antenna to broadcast in an omni-directional mode.

8. A system for controlling coverage in a wireless communications network, the system comprising:
    a first base station comprising a first multi-directional antenna and a first radio in communication with the first multi-directional antenna, the first multi-directional antenna comprising a plurality of signal transmitters each configured to broadcast a signal over a respective sector of coverage of the first multi-directional antenna;
    a second base station comprising a second multi-directional antenna and a second radio in communication with the second multi-directional antenna, the second multi-directional antenna comprising a plurality of signal transmitters each configured to broadcast a signal over a respective sector of coverage of the second multi-directional antenna;
    a control server in communication with the first multi-directional antenna and the second multi-directional antenna, the control server configured to:
        detect a disruption in a control signal provided to the first multi-directional antenna from the first base station, wherein the disruption causes a change in a first coverage footprint of the first multi-directional antenna such that it overlaps with a second coverage footprint of the second multi-directional antenna creating an inter-cell interference, and
        upon detecting the disruption causing the inter-cell interference, adjust a power supply to at least one of the first and the second multi-directional antennas to address the inter-cell interference.

9. The system of claim 8, wherein the plurality of signal transmitters of the first multi-directional antenna are individually configurable to form the first coverage footprint and the plurality of signal transmitters of the second multi-directional antenna are individually configurable to form the second coverage footprint, wherein the first and second coverage footprints are non-overlapping prior to the disruption being detected.

10. The system of claim 8, wherein the first and second multi-directional antennas are switch-beam antennas.

11. The system of claim 8, wherein the disruption causes the first multi-directional antenna to broadcast in an omni-directional mode.

12. A method for controlling coverage in a wireless communications network, the method comprising:
    detecting, using a control server in communication with a base station comprising a multi-directional antenna and a radio, a disruption event in a control signal provided to the multi-directional antenna from the base station, wherein the control signal controls the signals broadcast from a plurality of signal transmitters to form a first coverage footprint having a first coverage area;
    determining that the disruption event changed the first coverage footprint to a second coverage footprint having a second coverage area; and
    adjusting a power supply to the multi-directional antenna to modify the second coverage footprint to a third coverage footprint having a third coverage area, wherein the third coverage area is more desirable than the second coverage area.

13. The method of claim 12, wherein the second coverage footprint causes an inter-cell interference between the base station and another base station using the control server; and
    detecting the inter-cell interference, and determining that the inter-cell interference is above a threshold level.

14. The method of claim 12, wherein adjusting the power supply comprises increasing the power supply to increase a coverage area of the multi-directional antenna or decrease the power supply to decrease the coverage area.

15. The method of claim 12, wherein an inter-cell interference caused by the first coverage footprint is below a threshold level.

16. The method of claim 12, further comprising sending an alert indicating that the disruption event has changed the first coverage footprint to the second coverage footprint.

17. The method of claim 12, further comprising determining a maximum power supply increase or a maximum power supply decrease for the multi-directional antenna.

* * * * *